US012032093B2

(12) United States Patent
Kobayashi et al.

(10) Patent No.: US 12,032,093 B2
(45) Date of Patent: Jul. 9, 2024

(54) RADOME FOR ON-BOARD RADAR DEVICE

(71) Applicant: SANKEI GIKEN KOGYO CO., LTD., Tokyo (JP)

(72) Inventors: Hiroyuki Kobayashi, Tokyo (JP); Shinpei Yamamoto, Tokyo (JP); Makoto Takakusaki, Tokyo (JP); Ryuho Ikemasu, Tokyo (JP)

(73) Assignee: SANKEI GIKEN KOGYO CO., LTD., Tokyo (JP)

( * ) Notice: Subject to any disclaimer, the term of this patent is extended or adjusted under 35 U.S.C. 154(b) by 436 days.

(21) Appl. No.: 17/435,059

(22) PCT Filed: Feb. 7, 2020

(86) PCT No.: PCT/JP2020/004981
§ 371 (c)(1),
(2) Date: Aug. 31, 2021

(87) PCT Pub. No.: WO2020/179358
PCT Pub. Date: Sep. 10, 2020

(65) Prior Publication Data
US 2022/0163632 A1 May 26, 2022

(30) Foreign Application Priority Data
Mar. 7, 2019 (JP) .................................. 2019-041588

(51) Int. Cl.
*H01Q 1/42* (2006.01)
*G01S 7/03* (2006.01)
(Continued)

(52) U.S. Cl.
CPC .............. *G01S 7/4047* (2021.05); *G01S 7/03* (2013.01); *B60S 1/026* (2013.01); *B60S 1/56* (2013.01)

(58) Field of Classification Search
CPC ............ H01Q 1/32; H01Q 1/42; H01Q 1/421; H01Q 1/425; G01S 7/03; G01S 7/40;
(Continued)

(56) References Cited

U.S. PATENT DOCUMENTS

| 4,999,639 A | 3/1991 | Frazita et al. |
| 10,730,483 B2 * | 8/2020 | Ikeda ....................... B60J 1/002 |

(Continued)

FOREIGN PATENT DOCUMENTS

| JP | 4813726 B2 | 11/2011 |
| JP | 2018-66705 A | 4/2018 |
| JP | 2018-66706 A | 4/2018 |

OTHER PUBLICATIONS

International Search Report dated Apr. 21, 2020, issued in counterpart application No. PCT/JP2020/004981 (2 pages).

*Primary Examiner* — Tung X Le
(74) *Attorney, Agent, or Firm* — WHDA, LLP

(57) ABSTRACT

A radome for on-board radar devices 1 is provided with heater wires 3 wired in parallel so as to be separated from each other in a plane direction of an electromagnetic-wave-transmitting base member. A line pitch d of the heater wires 3 arranged in parallel in an electromagnetic-wave transmission region R of the base member is set to 0.2 to 2.5 times a wavelength of electromagnetic waves of the radar of an on-board radar device. A surface occupancy rate of the heater wires 3 arranged in parallel in the electromagnetic-wave transmission region R of the base member is set to be greater than 10% to 35%. The present invention provides a radome for on-board radar devices with which it is possible to obtain an electromagnetic-wave transmission property required of a radome, and to melt snow satisfactorily with a high heater performance.

12 Claims, 6 Drawing Sheets

(51) Int. Cl.
*G01S 7/40* (2006.01)
*B60S 1/02* (2006.01)
*B60S 1/56* (2006.01)

(58) Field of Classification Search
CPC ....... G01S 7/4047; B60R 11/02; B60R 13/00; B60S 1/026; B60S 1/56
See application file for complete search history.

(56) References Cited

U.S. PATENT DOCUMENTS

| | | | |
|---|---|---|---|
| 11,721,889 B2 * | 8/2023 | Kawashima | G01S 7/40 |
| | | | 342/175 |
| 2007/0252775 A1 * | 11/2007 | Munk | H01Q 1/421 |
| | | | 343/872 |
| 2018/0151939 A1 * | 5/2018 | Hashimoto | H01Q 1/1271 |
| 2019/0232886 A1 * | 8/2019 | Okumura | H01Q 1/02 |
| 2019/0293752 A1 * | 9/2019 | Ochiai | B60R 13/005 |
| 2019/0293763 A1 * | 9/2019 | Okumura | H05B 3/845 |
| 2020/0391698 A1 * | 12/2020 | Fukuda | G01S 7/4813 |

* cited by examiner

RADOME FOR ON-BOARD RADAR DEVICE

TECHNICAL FIELD

The present invention relates to a radome for on-board radar devices provided on the front side of an on-board radar device, and particularly relates to a radome for on-board radar devices having a snow melting function.

BACKGROUND ART

Conventionally, a radome that exhibits a snow melting function while ensuring a required electromagnetic-wave-transmitting property is known as a radome for on-board radar devices, and radomes of Patent Literatures 1 and 2 are known as such a radome. The radomes of Patent Literatures 1 and 2 have a structure in which heater wires are wired in parallel and separated from each other on the front surface of a base member installed so as to be substantially orthogonal to the electromagnetic-wave radiation direction of an on-board radar device.

In the radomes of Patent Literatures 1 and 2, in order to secure an electromagnetic-wave-transmitting property required as a radome for on-board radar devices, the pitch or the like of the straight portions of the heater wires is adjusted so that the area ratio of the heater wires is 10% or less, and an allowable value of 2.5 dB of an attenuation of electromagnetic waves is realized (see paragraphs [0052] and [0070] of Patent Literature 1 and paragraphs [0048] and [0077] of Patent Literature 2).

CITATION LIST

Patent Literature

[PTL 1]
Japanese Patent Application Publication No. 2018-66705
[PTL 2]
Japanese Patent Application Publication No. 2018-66706

SUMMARY OF INVENTION

Technical Problem

Patent Literatures 1 and 2 describe that the area ratio of the heater wires is set to 10% or less in order to realize a desired allowable value of the attenuation of electromagnetic waves. However, how to specifically set the line pitch of heater wires is not clearly described. Further, when the area ratio of the heater wires is set as small as 10% or less, there is a concern that the snow melting function may deteriorate.

The present invention has been proposed in view of the above-described problems, and an object of the present invention is to provide a radome for on-board radar devices capable of obtaining an electromagnetic-wave transmission property for the radar required as a radome and melting snow satisfactorily with a high heater performance.

Solution to Problem

A radome for on-board radar devices of the present invention includes: heater wires wired in parallel so as to be separated from each other in a plane direction of an electromagnetic-wave-transmitting base member, wherein a line pitch of the heater wires arranged in parallel in an electromagnetic-wave transmission region of the base member is set to 0.2 to 2.5 times a wavelength of electromagnetic waves of the radar of an on-board radar device, and a surface occupancy rate of the heater wires arranged in parallel in the electromagnetic-wave transmission region of the base member is set to be greater than 10% to 35%.

According to this configuration, it is possible to obtain the electromagnetic-wave transmission property required as a radome and melt snow satisfactorily due to the high heater performance provided by the heater wires having a high surface occupancy rate. Further, due to the heater wires arranged in parallel at a predetermined line pitch, it is possible to melt snow over the entire electromagnetic-wave transmission region in a well-balanced and satisfactory manner. Further, since the entire electromagnetic-wave transmission region can be melted in a well-balanced manner, it is possible to stabilize the electromagnetic-wave transmission performance in the entire electromagnetic-wave transmission region. From this viewpoint, an excellent electromagnetic-wave transmission performance can be obtained.

In the radome for on-board radar devices of the present invention, a line pitch of the heater wires arranged in parallel in the electromagnetic-wave transmission region of the base member is set to 1.6 to 2.0 times the wavelength of the electromagnetic waves of the radar of the on-board radar device, and the surface occupancy rate of the heater wires arranged in parallel in the electromagnetic-wave transmission region of the base member is set to be greater than 10% to 25%.

According to this configuration, it is possible to melt snow satisfactorily due to the high heater performance and exhibit a better electromagnetic-wave transmission performance.

In the radome for on-board radar devices of the present invention, the surface occupancy rate of the heater wires arranged in parallel in the electromagnetic-wave transmission region of the base member is set to be greater than 10% to 20%.

According to this configuration, it is possible to melt snow satisfactorily due to the high heater performance and achieve the allowable value of 2.0 dB of the attenuation of electromagnetic waves or its corresponding allowable value. Moreover, it is possible to exhibit a better electromagnetic-wave transmission performance.

In the radome for on-board radar devices of the present invention, the line pitch of the heater wires arranged in parallel in the electromagnetic-wave transmission region of the base member is set to 1.7 to 2.0 times the wavelength of the electromagnetic waves of the radar of the on-board radar device.

According to this configuration, it is possible to melt snow satisfactorily and reliably due to a higher heater performance and achieve the allowable value of 2.0 dB of the attenuation of electromagnetic waves or its corresponding allowable value. Moreover, it is possible to exhibit a better electromagnetic-wave transmission performance.

In the radome for on-board radar devices of the present invention, the line pitch of the heater wires arranged in parallel in the electromagnetic-wave transmission region of the base member is set to 1.5 to 2.3 times the wavelength of the electromagnetic waves of the radar of the on-board radar device, and the surface occupancy rate of the heater wires arranged in parallel in the electromagnetic-wave transmission region of the base member is set to be greater than 10% to 20%.

According to this configuration, it is possible to melt snow satisfactorily due to the high heater performance and achieve the allowable value of 2.5 dB of the attenuation of electromagnetic waves or its corresponding allowable value. Moreover, it is possible to exhibit a better electromagnetic-wave transmission performance.

In the radome for on-board radar devices of the present invention, the surface occupancy rate of the heater wires arranged in parallel in the electromagnetic-wave transmission region of the base member is set to be greater than 10% to 15%.

According to this configuration, it is possible to melt snow satisfactorily due to the high heater performance and achieve the allowable value of 2.5 dB of the attenuation of electromagnetic waves or its corresponding allowable value. Moreover, it is possible to exhibit a better electromagnetic-wave transmission performance. Further, it is possible to improve the degree of freedom in setting the line pitch of the heater wires and the degree of freedom in design so as to correspond to the wavelength of the radar used.

In the radome for on-board radar devices of the present invention, directions of currents flowing through the heater wires that are wired adjacent to each other are substantially anti-parallel to each other.

According to this configuration, since the directions of the currents flowing through the adjacent heater wires are substantially anti-parallel to each other, the electromagnetic waves radiated from the adjacent heater wires have opposite phases, and the electromagnetic radiation from the heater wires can be canceled and a better electromagnetic-wave transmission performance can be obtained. In particular, since the directions of the currents flowing through the heater wires wired adjacent to each other are substantially anti-parallel to each other, it is possible to exhibit an extremely excellent electromagnetic-wave transmission performance as a whole.

Advantageous Effects of Invention

According to the radome for on-board radar devices of the present invention, it is possible to obtain an electromagnetic-wave transmission property for the radar required as a radome and melt snow satisfactorily with a high heater performance.

DESCRIPTION OF EMBODIMENTS

[Radome for On-Board Radar Device According to Embodiment]

Figure 1:
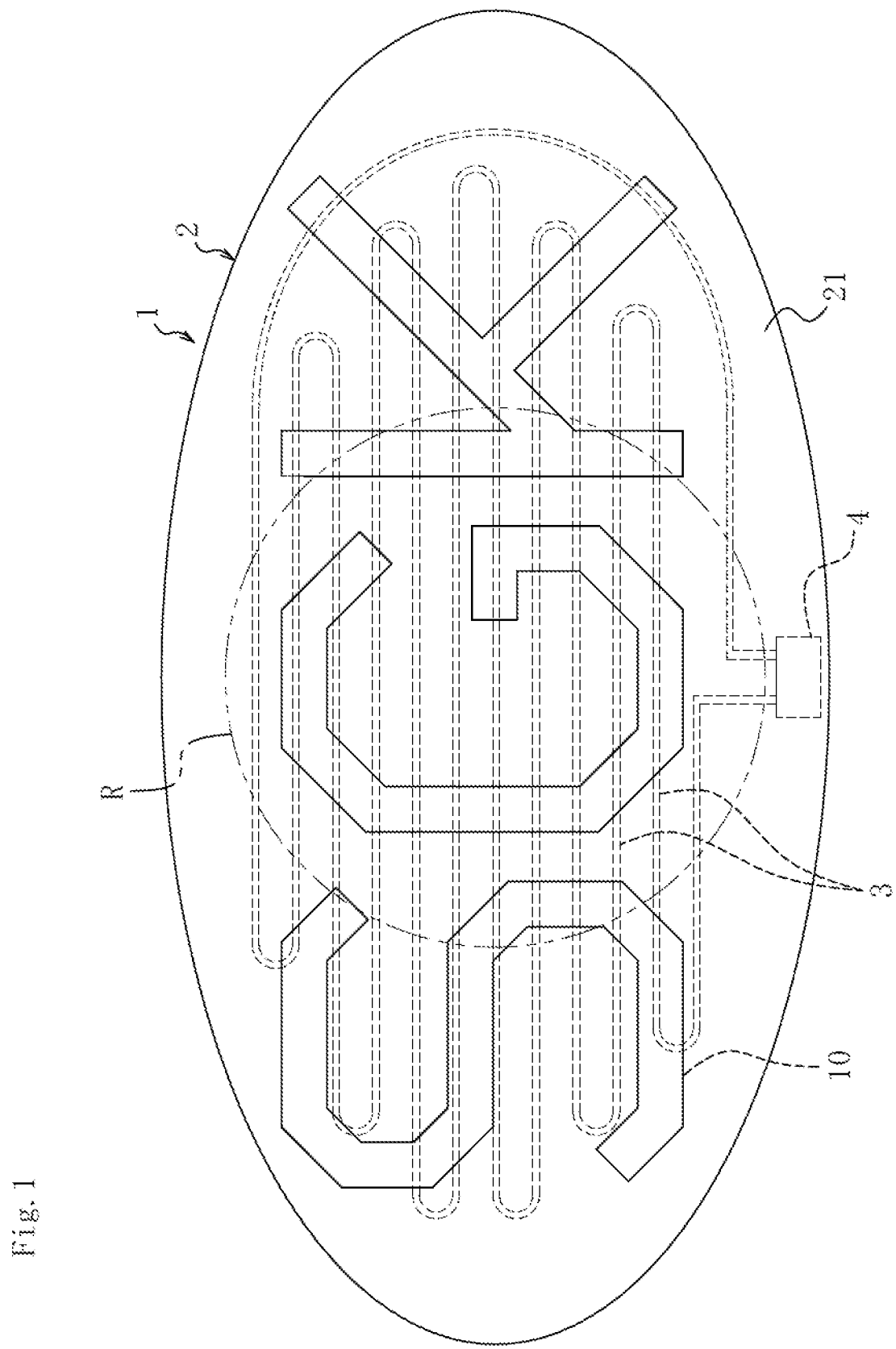
FIG. 1 is a front view of a radome for on-board radar devices according to an embodiment of the present invention.
Figure 2:
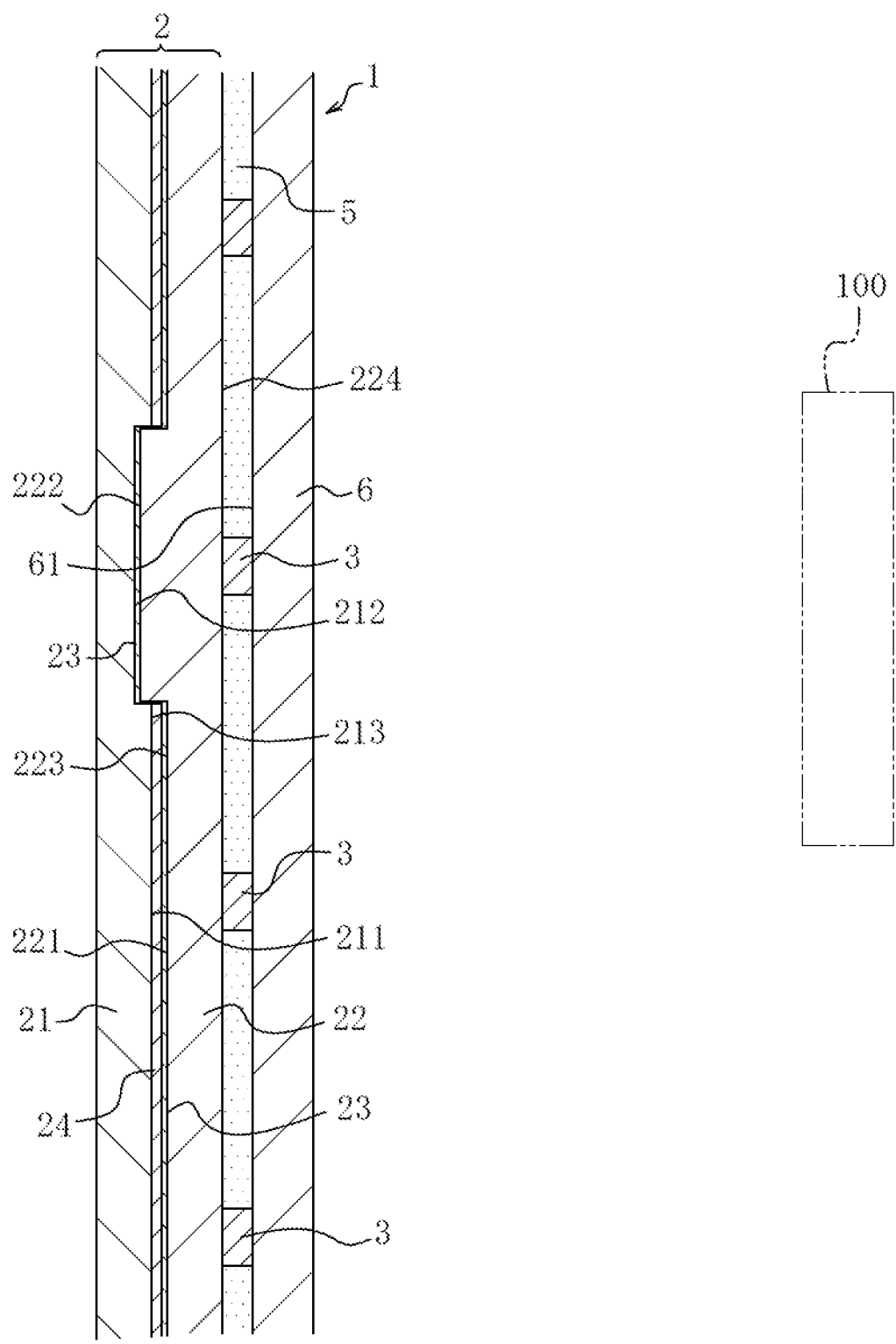
FIG. 2 is a partially enlarged longitudinal explanatory view of the radome for on-board radar devices according to the embodiment.

As illustrated in FIGS. 1 and 2, a radome for on-board radar devices 1 according to an embodiment of the present invention includes an electromagnetic-wave-transmitting base 2 and heater wires 3 wired in parallel so as to be separated from each other in a plane direction of the base 2. The heater wires 3 are provided on a back side of the base 2. The base 2 of the illustrated example has an elliptical shape in a front view, and the heater wires 3 are wired along the elliptical surface. Reference numeral 10 in FIG. 1 is a mark symbol portion which is a symbol portion such as a character of a mark such as an emblem, and in the illustrated example, a character-shaped mark symbol portion 10 is illustrated.

The base 2 includes a transparent front base member 21 and a rear base member 22, and the front base member 21 and the rear base member 22 are insulating members and have an electromagnetic-wave transmission property. From the viewpoint of improving an electromagnetic-wave transmission performance, the front base member 21 and the rear base member 22 are preferably formed of materials (for example, the same materials) of which the refractive indices n defined on the basis of the complex permittivity match each other or are substantially the same or close to each other. As for the numerical range of the close refractive indices of the front base member 21 and the rear base member 22, it is preferable that the difference between the refractive indices of the front base member 21 and the rear base member 22 is within the range of 0 to 10%.

The refractive index n here is a quantity defined as Equation 1 from the real part of relative permittivity εr' and the imaginary part of relative permittivity εr". From the viewpoint of a transmission property, it is preferable that the magnitude of the dielectric tangent (loss tangent) tan δ defined as Equation 2 from the ratio of the imaginary part and the real part at an applied frequency is 0.1 or less. Moreover, it is preferable that the magnitude of the real part of relative permittivity is 3 or less. By setting the magnitudes of the dielectric tangent and real part of relative permittivity to these values or smaller, it is possible to ensure a reduction in the reflectance and internal loss required for the redome.

$$n = \sqrt{\frac{\varepsilon_r' + \sqrt{\varepsilon_r'^2 + \varepsilon_r''^2}}{2}} \qquad \text{[Math. 1]}$$

$$\tan\delta = \frac{\varepsilon_r''}{\varepsilon_r'} \qquad \text{[Math. 2]}$$

As the front base member 21 and the rear base member 22, appropriate materials such as synthetic resins, glass, and ceramics can be used within the scope of the present invention, but preferably an insulating synthetic resin may be used. The transparent front base member 21 is preferably formed of a colorless material or a colored material having a visible light transmittance of 50% or more in order to ensure good visibility.

When the front base member 21 is an insulating transparent synthetic resin, an appropriate material may be used within an applicable range. For example, an acrylic resin such as polymethyl methacrylate (PMMA), polycarbonate (PC), acrylonitrile-butadiene-styrene copolymer (ABS), polyethylene terephthalate (PET), polyethylene (PE), polypropylene (PP), acrylonitrile-styrene copolymer (AS), polystyrene (PS), and cycloolefin polymer (COP) may be used alone or in combination of two or more, and may contain an additive.

When the rear base member 22 is an insulating synthetic resin, an appropriate material may be used within an applicable range. For example, an acrylic resin such as polymethyl methacrylate (PMMA), polycarbonate (PC), acrylonitrile-butadiene-styrene copolymer (ABS), acrylonitrile-styrene-acrylate copolymer (ASA), and acrylonitrile-ethylene propyl rubber-styrene copolymer (AES) may be used alone or in combination of two or more, and may contain an additive.

A concave portion 212 is formed on a back surface 211 of the front base member 21 at a position corresponding to the mark symbol portion 10. A convex portion 222 is formed on the front surface 221 of the rear base member 22 at a position corresponding to the mark symbol portion 10. The base member 21 and the rear base member 22 are laminated so that the concave portion 212 and the convex portion 222 formed at the corresponding position fit each other. An electromagnetic-wave-transmitting metal layer 23 is provided in close contact with an entire surface of the convex portion 222 of the front surface 221 of the rear base member 22 and an entire surface of a flat surface portion 223 around the convex portion 222.

The electromagnetic wave permeable metal layer 23 is configured as a discontinuous metal layer having an electromagnetic-wave transmission property and a metallic luster. The electromagnetic-wave-transmitting metal layer 23 exhibits brilliant and integrated visibility, and is formed on the front surface 221 of the rear base member 22 by electroless plating, deposition, or sputtering. When the electromagnetic-wave-transmitting metal layer 23 is configured as a discontinuous metal layer having brilliant and integrated visibility, for example, nickel or nickel alloys, chromium or chromium alloys, cobalt or cobalt alloys, tin or tin alloys, copper or copper alloys, silver or silver alloys, palladium or palladium alloys, platinum or platinum alloys, rhodium or rhodium alloys, gold or gold alloys may be used.

In addition to the discontinuous metal layer which has an electromagnetic-wave transmission property and exhibits the metallic luster and integrated visibility, the electromagnetic-wave-transmitting metal layer 23 may be an appropriate electromagnetic-wave-transmitting metal layer within the scope of the present invention. For example, a semiconductor layer such as silicon or germanium formed by deposition or sputtering, or an alloy layer of this semiconductor and a brilliant metal such as a metal having a visible light reflectance of 50% or more (for example, gold, silver, copper, aluminum, platinum, palladium, iron, nickel, chromium) can be used. Further, between the front surface 221 of the rear base 22 and the electromagnetic-wave-transmitting metal layer 23, a base layer such as a transparent base layer can be provided as necessary, for example, a base layer for forming a modified surface that facilitates the formation of an electroless plating layer.

A colored layer 24, which is laminated on the front surface side of the electromagnetic-wave-transmitting metal layer 23 and is a decorative layer, is provided in close contact with the flat surface portion 223 around the convex portion 222 of the rear base member 22. That is, the colored layer 24 is provided in a region corresponding to a flat surface portion 213 around a concave portion 212 on the back surface 211 of the front base member 21. The colored layer 24 has an electromagnetic-wave transmission property and is formed by being fixed to the front surface of the electromagnetic-wave-transmitting metal layer 23 by printing, coating using a coating mask, or the like.

The front base member 21 is provided so as to be fixed to the front side of the rear base member 22 on which the electromagnetic-wave-transmitting metal layer 23 and the colored layer 24 are formed. Fixing of the front base member 21 can be realized, for example, by an adhesive layer of an adhesive agent provided between the back surface 211 of the front base member 21 and the electromagnetic-wave-transmitting metal layer 23 and the colored layer 24 formed on the rear base member 22. Alternatively, the fixing can be realized, for example, by pouring a molten resin serving as the front base member 21 onto the front side of the rear base member 22 by injection molding on which the electromagnetic-wave-transmitting metal layer 23 and the colored layer 24 are formed, and fusing the back surface 211 of the front base member 21 onto the electromagnetic-wave-transmitting metal layer 23 and the colored layer 24 formed on the rear base member 22.

Further, instead of the above-mentioned fixing method, the colored layer 24 may be fixedly formed on the flat surface portion 213 around the concave portion 212 of the back surface 211 of the front base member 21 by printing, coating using a coating mask, or the like, and the electromagnetic-wave-transmitting metal layer 23 formed on the rear base member 22 may be fixed to the colored layer 24 of the front base member 21 and the concave portion 212 of the front base member 21 by adhesion or the like via an adhesive layer of an adhesive agent.

The heater wires 3 are provided on the back side of the base 2 composed of the transparent front base member 21 and the rear base member 22, and are arranged on the rear side of the mark symbol portion 10. Further, the heater wires 3 are wired along the back surface 224 of the rear base member 22 corresponding to the electromagnetic-wave-transmitting base member, and are wired in parallel so as to be separated in the plane direction of the back surface 224 of the rear base member 22. The heater wires 3 may be configured as appropriate applicable heating wires such as a transparent conductive film such as an ITO film, a nichrome wire, an iron chromium wire, or carbon fiber, and are wired by being formed on the back surface 224 of the rear base member 22 by printing, deposition, sputtering, plating, or wire bonding.

Figure 4:
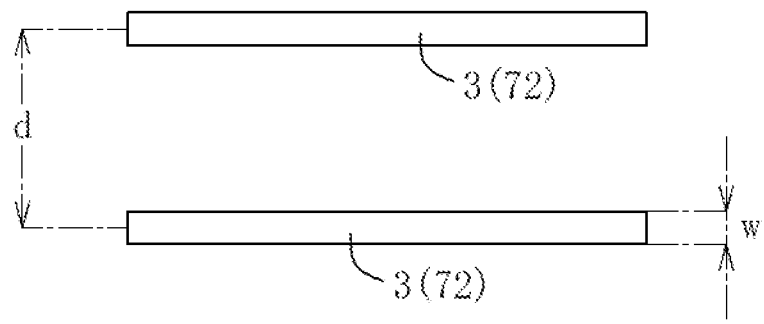
FIG. 4 is an explanatory diagram illustrating the line pitch and line width of the heater wires.
Figure 4:
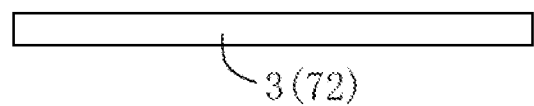

The heater wires 3 are provided so that the line pitch d of the heater wires 3 arranged in parallel in the electromagnetic-wave transmission region R of the rear base member 22 corresponding to the base 2 or the base member is set to 0.2 to 2.5 times the wavelength (the wavelength (the wavelength in the air) of the radar electromagnetic waves exhibiting the radar function of the on-board radar device 100) of electromagnetic waves of the radar of the on-board radar device 100 or the wavelength in the air of millimeter electromagnetic waves. Moreover, the surface occupancy rate of the heater wires 3 arranged in parallel in the electromagnetic-wave transmission region R is set to be greater than 10% to 35%. Here, the line pitch d of the heater wires 3 is the distance between the center positions of adjacent heater wires 3 in the width direction. The surface occupancy rate of the heater wires is a value calculated by (line width w of the heater wires)/(line pitch d of the heater wires)×100 (see FIG. 4).

Preferably, the heater wires 3 may be provided so that the line pitch d of the heater wires 3 arranged in parallel in the electromagnetic-wave transmission region R of the rear base member 22 corresponding to the base 2 or the base member is set to 1.6 to 2.0 times the wavelength (the wavelength in the air) of the electromagnetic waves of the radar of the on-board radar device 100 and the surface occupancy rate of the heater wires 3 arranged in parallel in the electromagnetic-wave transmission region R is set to be greater than 10% to 25%. Further, in this preferred configuration, it is more preferable that the heater wires 3 are provided so that the surface occupancy rate of the heater wires 3 arranged in parallel in the electromagnetic-wave transmission region R of the rear base member 22 corresponding to the base 2 or the base member is set to be greater than 10% to 20%. Further, in this preferred configuration, the line pitch d of the heater wires 3 arranged in parallel in the electromagnetic-wave transmission region R of the rear base member 22 corresponding to the base 2 or the base member is set to 1.7 to 2.0 times the wavelength (the wavelength in the air) of the electromagnetic waves of the radar of the on-board radar device 100.

Further, preferably, the heater wires 3 may be provided so that the line pitch d of the heater wires 3 arranged in parallel in the electromagnetic-wave transmission region R of the rear base member 22 corresponding to the base 2 or the base member is set to 1.5 to 2.3 times the wavelength (the wavelength in the air) of the electromagnetic waves of the radar of the on-board radar device 100 and the surface occupancy rate of the heater wires 3 arranged in parallel in the electromagnetic-wave transmission region R is set to be greater than 10% to 20%.

Further, preferably, the heater wires 3 may be provided so that the surface occupancy rate of the heater wires 3 arranged in parallel in the electromagnetic-wave transmission region R of the rear base member 22 corresponding to the base 2 or the base member is set to be greater than 10% to 15%.

Both ends of the heater wires 3 of the present embodiment are electrically connected and mechanically fixed to a connector 4, and electric power is supplied to the heater wires 3 via the connector 4 so that the heater wires 3 generate heat. The heater wires 3 extending from the connector 4 are wired so as to meander and fold back in the plane direction of the back surface 224 of the rear base member 22, and are formed to extend in series. The directions of the currents flowing through the heater wires 3 wired adjacent to each other are set to be substantially anti-parallel or anti-parallel to each other.

A back member 6 is provided at a position on the rear side of the heater wires 3 and is fixed to the base 2. The back member 6 is an insulating member and has an electromagnetic-wave transmission property, and is formed in the same shape as the rear base member 22. From the viewpoint of improving an electromagnetic-wave transmission performance, the back member 6 and the front base member 21 and the rear base member 22 are preferably formed of materials of which the refractive indices defined on the basis of the complex permittivity match each other or are substantially the same or close to each other. For example, it is preferable that the back member 6 is formed of the same material as the rear base member 22.

In this example, an adhesive layer 5 is provided so as to be filled in a portion of the back surface 224 of the rear base member 22 in which the heater wires 3 are not wired, and the back member 6 and the rear base member 22 are bonded by the adhesive layer 5 of an adhesive agent. The adhesive layer 5 can be formed of an appropriate applicable material having an insulating and electromagnetic-wave transmission property. For example, methyl acrylate, ethyl acrylate, butyl acrylate, methyl methacrylate, ethyl methacrylate, and the like can be used. The heater wires 3 can also be formed and wired on the front surface 61 of the back member 6 by printing or the like.

The radome for vehicle-mounted radar devices 1 is arranged in front of the vehicle-mounted radar device 100 and is attached to a vehicle. Although the radome for on-board radar devices 1 in the illustrated example is an emblem-shaped radome, the radome for on-board radar devices of the present invention can be configured as an appropriate vehicle-mounted component such as a bumper.

According to the radome for on-board radar devices 1 of the present embodiment, it is possible to obtain the electromagnetic-wave transmission property required as a radome and melt snow satisfactorily due to the high heater performance provided by the heater wires 3 having a high surface occupancy rate. Further, due to the heater wires 3 arranged in parallel at a predetermined line pitch d, it is possible to melt snow over the entire electromagnetic-wave transmission region R in a well-balanced and satisfactory manner. Further, since the entire electromagnetic-wave transmission region R can be melted in a well-balanced manner, it is possible to stabilize the electromagnetic-wave transmission performance in the entire electromagnetic-wave transmission region R. From this viewpoint, an excellent electromagnetic-wave transmission performance can be obtained.

Further, according to a preferred configuration in which the line pitch d of the heater wires 3 arranged in parallel in the electromagnetic-wave transmission region R is set to 1.6 to 2.0 times the wavelength of the electromagnetic waves of the radar of the on-board radar device 100, and the surface occupancy rate of the heater wires 3 arranged in parallel in the electromagnetic-wave transmission region R is set to be greater than 10% to 25%, it is possible to melt snow satisfactorily due to the high heater performance and exhibit a better electromagnetic-wave transmission performance. In particular, in this preferred configuration, when the surface occupancy rate of the heater wires 3 arranged in parallel in the electromagnetic-wave transmission region R is set to be greater than 10% to 20%, it is possible to melt snow satisfactorily due to the high heater performance and achieve the allowable value of 2.0 dB of the attenuation of electromagnetic waves or its corresponding allowable value. Moreover, it is possible to exhibit a better electromagnetic-wave transmission performance. Further, in this preferred configuration, when the line pitch d of the heater wires 3 arranged in parallel in the electromagnetic-wave transmission region R is set to 1.7 to 2.0 times the wavelength of the electromagnetic waves of the radar of the on-board radar device 100, it is possible to melt snow satisfactorily and reliably due to a higher heater performance and achieve the allowable value of 2.0 dB of the attenuation of electromagnetic waves or its corresponding allowable value. Moreover, it is possible to exhibit a better electromagnetic-wave transmission performance.

Further, according to a preferred configuration in which the line pitch d of the heater wires 3 arranged in parallel in the electromagnetic-wave transmission region R is set to 1.5 to 2.3 times the wavelength of the electromagnetic waves of the radar of the on-board radar device 100, and the surface occupancy rate of the heater wires 3 arranged in parallel in the electromagnetic-wave transmission region R is set to be greater than 10% to 20%, it is possible to melt snow satisfactorily due to the high heater performance and achieve the allowable value of 2.5 dB of the attenuation of electromagnetic waves or its corresponding allowable value. Moreover, it is possible to exhibit a better electromagnetic-wave transmission performance.

Further, according to a preferred configuration in which the surface occupancy rate of the heater wires 3 arranged in parallel in the electromagnetic-wave transmission region R of the rear base member 22 corresponding to the base 2 or the base member is set to be greater than 10% to 15%, it is possible to melt snow satisfactorily due to the high heater performance and achieve the allowable value of 2.5 dB of the attenuation of electromagnetic waves or its corresponding allowable value. Moreover, it is possible to exhibit a better electromagnetic-wave transmission performance. Further, it is possible to improve the degree of freedom in setting the line pitch d of the heater wires 3 and the degree of freedom in design.

Further, since the directions of the currents flowing through the adjacent heater wires 3 are substantially anti-parallel or anti-parallel to each other, the electromagnetic waves radiated from the adjacent heater wires 3 have opposite phases, and the electromagnetic radiation from the heater wires 3 can be canceled and a better electromagnetic-wave transmission performance can be obtained. In particular, since the directions of the currents flowing through the heater wires 3 wired adjacent to each other are substantially anti-parallel or anti-parallel to each other, it is possible to exhibit an extremely excellent electromagnetic-wave transmission performance as a whole.

Figure 3A:
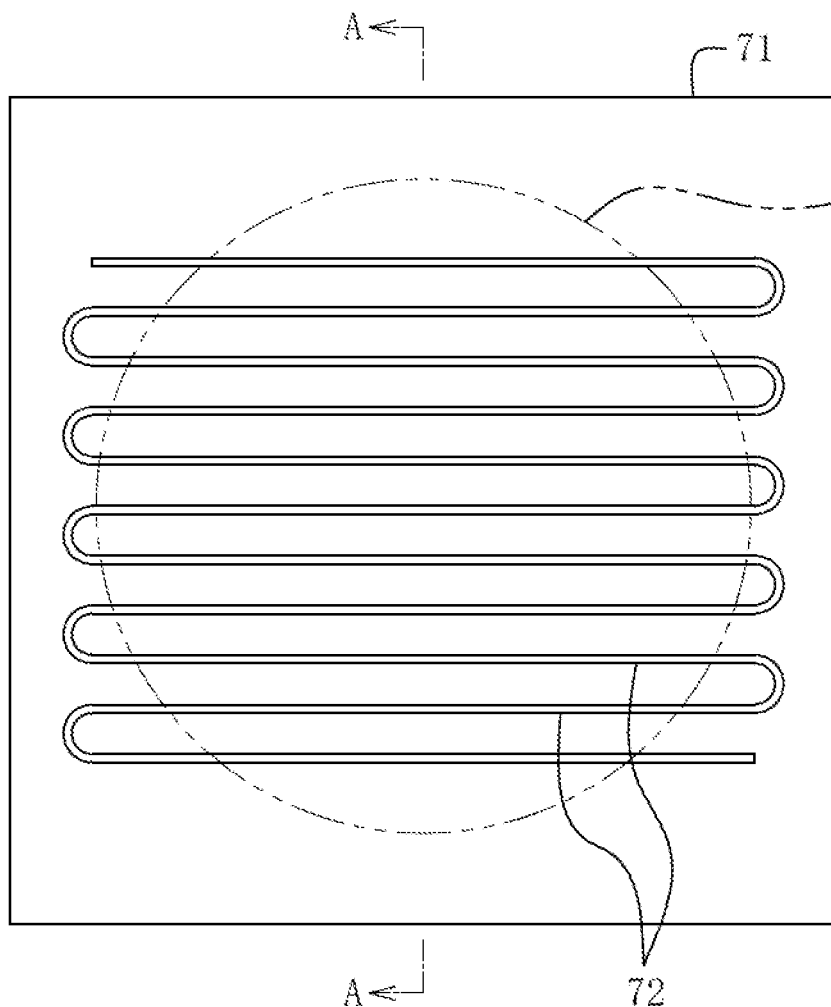
FIG. 3(a) is a rear view of a base member and heater wires of an embodiment constituting a radome for on-board radar devices.
Figure 3B:
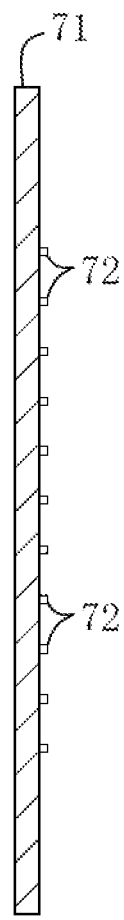
FIG. 3(b) is a cross-sectional view thereof taken along line A-A.
Figure 5:
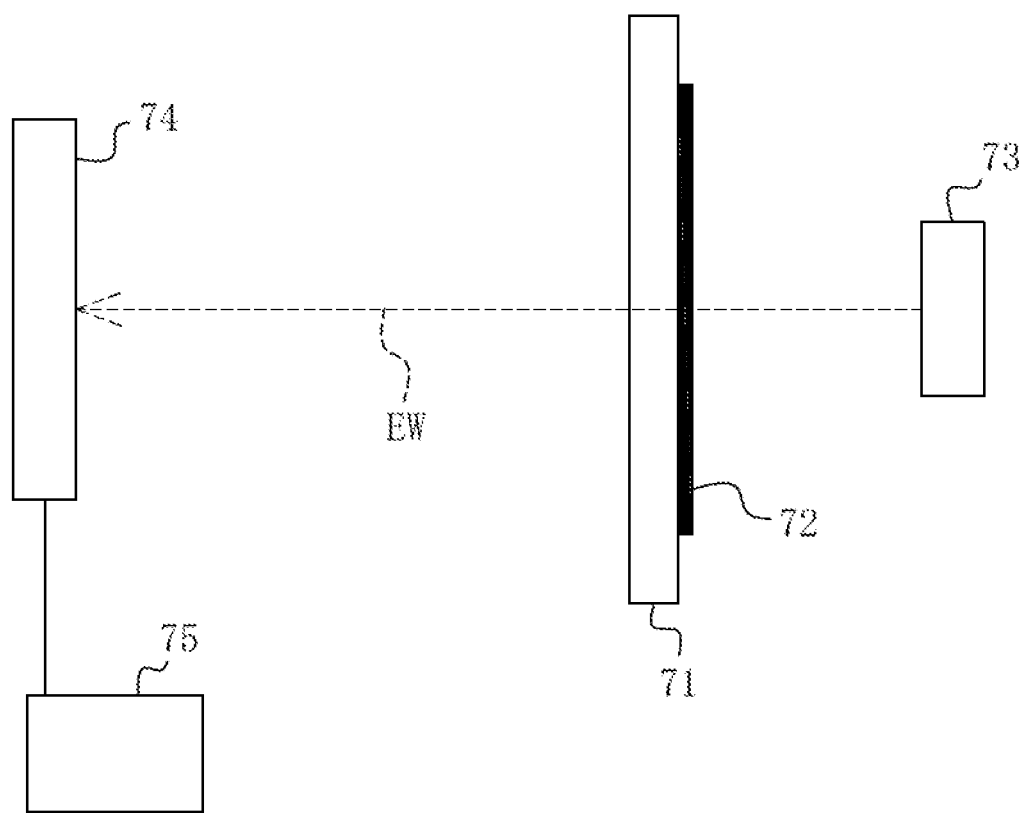
FIG. 5 is a schematic view of a measuring device that measures the relationship between the surface occupancy rate of heater wires, the line pitch of heater wires, and the electromagnetic-wave transmittance.

Experimental Example of Relationship Between Surface Occupancy Rate of Heater Wires, Line Pitch of Heater Wires, and Electromagnetic-Wave Transmittance As a synthetic resin plate corresponding to electromagnetic-wave-transmitting base member of the radome for on-board radar devices of the present invention, using a synthetic resin plate 71 having a thickness of 5.993 mm formed of AES (acrylonitrile-ethylene propyl rubber-styrene copolymer) having a relative permittivity of 2.665 and a dielectric tangent of 0.01 as illustrated in FIGS. 3 and 5, the heater wires 72 having a surface resistance of 0.2Ω/□ were folded back and wired on the synthetic resin plate 71 so as to meander. The heater wires 72 were wired so that the straight portions of the heater wires 72 were arranged in parallel at regular intervals in the electromagnetic-wave transmission region R', and the experiment was performed while changing the surface occupancy rate of the heater wires 72 and the line pitch d of the heater wires 72 (see FIG. 4).

Measurements of the experiment were performed using a radar alignment system (RAS) model SM5899 manufactured by KEYCOM. FIG. 5 schematically illustrates an electromagnetic-wave transmitter 73, a receiver 74, and an evaluation device 75 of this system. The transmitted electromagnetic waves are electromagnetic waves of 76.5 GHz, and EW is the propagation direction of the electromagnetic waves. The thickness 5.993 mm of the synthetic resin plate 71 here corresponds to exactly five times the half wavelength of the synthetic resin plate 71 at 76.5 GHz.

Then, the transmittance of electromagnetic waves was measured while radiating electromagnetic waves from the heater wires 72 side of the synthetic resin plate 71 and changing the line pitch d of the heater wires 72 for each surface occupancy rate of 5%, 10%, 15%, 20%, 25%, 30%, 35%, and 40% of the heater wires 72 in an electromagnetic-wave transmission region R'. No current was flowing through the heater wires 72 during each measurement. The measurement results are illustrated in FIGS. 6 and 7.

Figure 6:
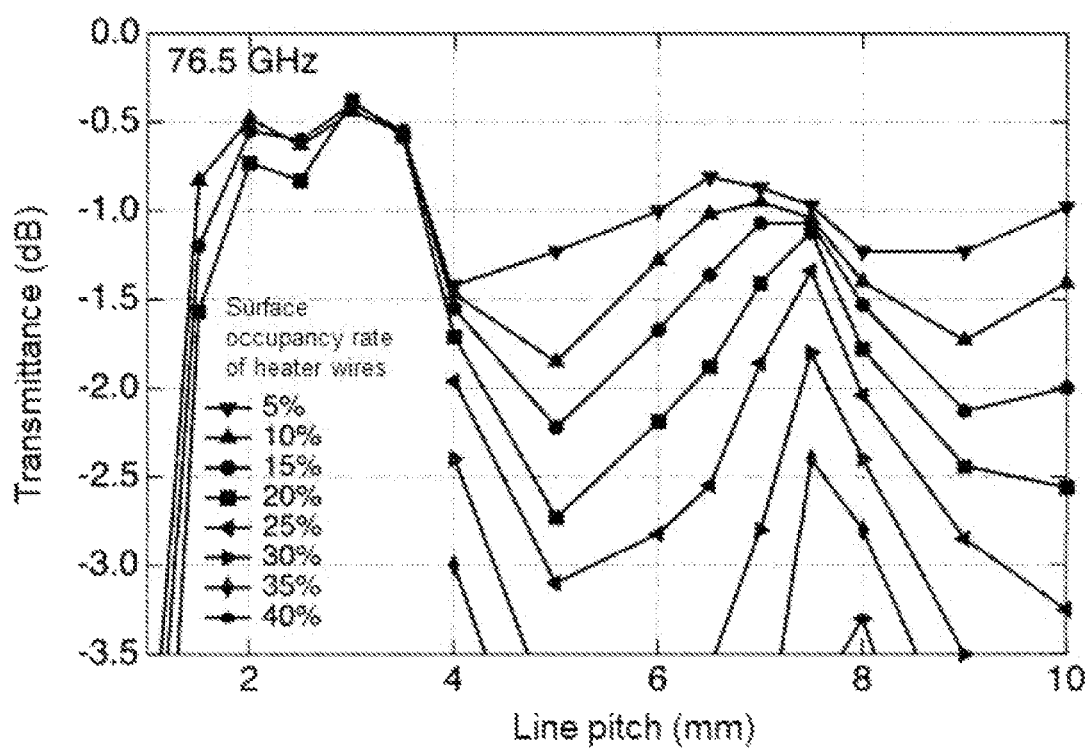
FIG. 6 is a graph of an experimental example illustrating the relationship between the surface occupancy rate of heater wires at 76.5 GHz, the line pitch (unit: mm) of heater wires, and the electromagnetic-wave transmittance.
Figure 7:
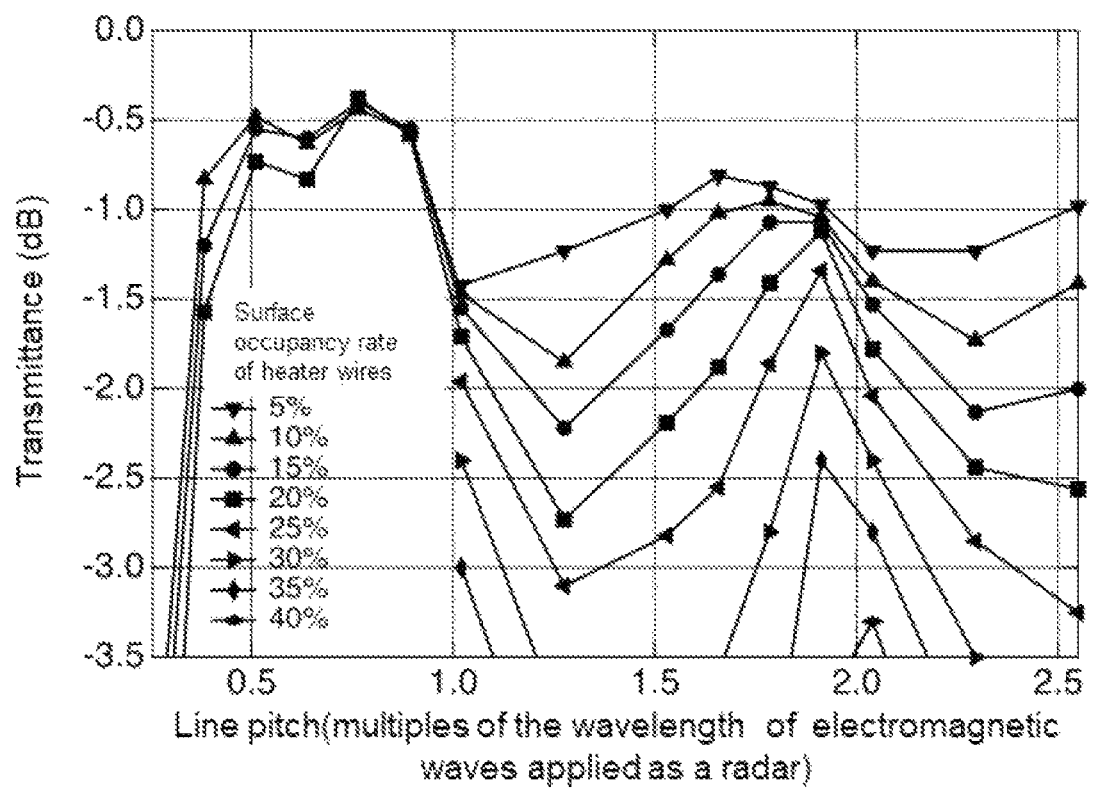
FIG. 7 is a graph of an experimental example illustrating the relationship between the surface occupancy rate of a heater wire, the line pitch of heater wires (expressed as multiples of the wavelength of electromagnetic waves applied as a radar), and the electromagnetic wave transmittance.

According to FIGS. 6 and 7, from the viewpoint of ensuring the electromagnetic-wave transmission property required as a radome and ensuring a high heater performance capable of melting snow satisfactorily, the line pitch d of the heater wires 72 arranged in parallel in the electromagnetic-wave transmission region R' of the synthetic resin plate 71 corresponding to the base member is set to 0.2 to 2.5 times, preferably 1.6 to 2.0 times, and more preferably, 1.7 to 2.0 times the wavelength (wavelength in the air) of the electromagnetic waves radiated by the electromagnetic-wave transmitter 73 corresponding to the electromagnetic waves of the radar of the on-board radar device. Further, the surface occupancy rate of the heater wires 72 arranged in parallel in the electromagnetic-wave transmission region R' is set to be greater than 10% to 35%, preferably greater than 10% to 25%, and more preferably greater than 10% to 20%. According to this, for example, when applied to a 76/77 GHz-band radar, the wavelength of the electromagnetic waves in the air of 76.0 GHz is 3.94 mm, and the wavelength of the electromagnetic waves in the air of 76.0 GHz is 3.89 mm. Therefore, the line pitch d of the heater wires 72 is set to 0.78 to 9.73 mm, preferably 6.30 to 7.78 mm, and more preferably 6.69 to 7.78 mm, and the surface occupancy rate of the heater wires 72 arranged in parallel in the electromagnetic-wave transmission region R' is set to be greater than 10% to 35%, preferably greater than 10% to 25%, and more preferably greater than 10% to 20%. Note that FIG. 6 is an example in the case of 76.5 GHz (the wavelength of the electromagnetic waves in the air is 3.92 mm).

Further, even when the line pitch d of the heater wires 72 arranged in parallel in the electromagnetic-wave transmission region R' of the synthetic resin plate 71 corresponding to the base member is set to 1.5 to 2.3 times the wavelength (the wavelength in the air) of the electromagnetic waves radiated by the electromagnetic-wave transmitter 73 corresponding to the electromagnetic waves of the radar of the on-board radar device, and the surface occupancy rate of the heater wires 72 arranged in parallel in the electromagnetic-wave transmission region R' is set to be greater than 10% to 20%, it is possible to melt snow satisfactorily due to a high heater performance and achieve the allowable value of 2.5 dB of the attenuation of electromagnetic waves or its corresponding allowable value, which is thus satisfactory.

Further, even when the surface occupancy rate of the heater wires 72 arranged in parallel in the electromagnetic-wave transmission region R' of the synthetic resin plate 71 corresponding to the base member is set to be greater than 10% to 20%, it is possible to melt snow satisfactorily due to the high heater performance, achieve the allowable value of 2.5 dB of the attenuation of electromagnetic waves or its corresponding allowable value, and improve of freedom in design, which is thus satisfactory.

[Scope of Invention Disclosed in this Specification]

The invention disclosed in this specification includes, in addition to the configurations according to respective inventions or embodiments, a matter defined by modifying any of these partial configurations into other configurations disclosed in this specification within an applicable range, a matter defined by adding any other configurations disclosed in this specification to these partial configurations, or a matter defined into a generic concept by cancelling any of these partial configurations within a limit that achieves a partial operational advantage. The invention disclosed in this specification further includes the following modifications and the added matters.

For example, the radome for on-board radar devices of the present invention is preferably configured so that the directions of the currents flowing through the heater wires wired adjacent to each other are substantially anti-parallel or anti-parallel to each other. However, the directions of the currents flowing through the heater wires may not be substantially anti-parallel or anti-parallel to each other. Further, the electromagnetic-wave-transmitting base member of the radome for on-board radar devices of the present invention is not limited to the rear base member 22 when the front base member 21 and the rear base member 22 of the embodiment are provided. The electromagnetic-wave-transmitting base member can be appropriately modified within the scope of the spirit of the present invention and may include an appropriate base member in which heater wires are wired in the plane direction.

Further, the electromagnetic waves of the radar to which the radome for on-board radar devices of the present invention is applied can be modified within an applicable scope. The radome can be applied to other electromagnetic waves for other radars in addition to the 24/26 GHz-band, 76/77 GHz band, 77/81 GHz-band radars, which are practically used as on-board radars. In addition, the present invention can be applied by setting the installation pattern of the heater wires so as to correspond to an appropriate frequency. Further, when a radar having a shorter wavelength is put into practical use, the present invention can be similarly applied by setting the installation pattern of heater wires.

INDUSTRIAL APPLICABILITY

The present invention can be used for a radome for on-board radar devices.

REFERENCE SIGNS LIST

1 Radome for on-board radar device
2 Base
21 Front base member
211 Back surface
212 Concave portion
213 Flat surface
22 Rear base member
221 Front surface
222 Convex portion
223 Flat surface portion
224 Back surface
23 Electromagnetic-wave-transmitting metal layer
24 Colored layer
3 Heater wire
4 Connector
5 Adhesive layer
6 Back member
61 Surface
10 Mark symbol portion
100 On-board radar device
R, R' Electromagnetic-wave transmission region
d Line pitch of heater wire
w Line width of heater wires
71 Synthetic resin plate
72 Heater wire
73 Electromagnetic-wave transmitter
74 Receiver
75 Evaluation device
EW Propagation direction of electromagnetic waves

The invention claimed is:

1. A radome for an on-board radar device comprising:
   heater wires wired in parallel so as to be separated from each other in a plane direction of an electromagnetic-wave-transmitting base member, wherein
   a line pitch of the heater wires arranged in parallel in an electromagnetic-wave transmission region of the base member is set to 0.2 to 2.5 times a wavelength of electromagnetic waves of a radar of the on-board radar device, and
   a surface occupancy rate of the heater wires arranged in parallel in the electromagnetic-wave transmission region of the base member is set to be greater than 10% to 35%.

2. The radome for the on-board radar device according to claim 1, wherein
   the line pitch of the heater wires arranged in parallel in the electromagnetic-wave transmission region of the base member is set to 1.6 to 2.0 times the wavelength of the electromagnetic waves of the radar of the on-board radar device, and
   the surface occupancy rate of the heater wires arranged in parallel in the electromagnetic-wave transmission region of the base member is set to be greater than 10% to 25%.

3. The radome for the on-board radar device according to claim 2, wherein
   the surface occupancy rate of the heater wires arranged in parallel in the electromagnetic-wave transmission region of the base member is set to be greater than 10% to 20%.

4. The radome for the on-board radar device according to claim 3, wherein
   directions of currents flowing through the heater wires that are wired adjacent to each other are substantially anti-parallel to each other.

5. The radome for the on-board radar device according to claim 2, wherein
   the line pitch of the heater wires arranged in parallel in the electromagnetic-wave transmission region of the base member is set to 1.7 to 2.0 times the wavelength of the electromagnetic waves of the radar of the on-board radar device.

6. The radome for the on-board radar device according to claim 5, wherein
   directions of currents flowing through the heater wires that are wired adjacent to each other are substantially anti-parallel to each other.

7. The radome for the on-board radar device according to claim 2, wherein
   directions of currents flowing through the heater wires that are wired adjacent to each other are substantially anti-parallel to each other.

8. The radome for the on-board radar device according to claim 1, wherein
   the line pitch of the heater wires arranged in parallel in the electromagnetic-wave transmission region of the base member is set to 1.5 to 2.3 times the wavelength of the electromagnetic waves of the radar of the on-board radar device, and
   the surface occupancy rate of the heater wires arranged in parallel in the electromagnetic-wave transmission region of the base member is set to be greater than 10% to 20%.

9. The radome for the on-board radar device according to claim 8, wherein
   directions of currents flowing through the heater wires that are wired adjacent to each other are substantially anti-parallel to each other.

10. The radome for the on-board radar device according to claim 1, wherein
   the surface occupancy rate of the heater wires arranged in parallel in the electromagnetic-wave transmission region of the base member is set to be greater than 10% to 15%.

11. The radome for the on-board radar device according to claim 10, wherein
   directions of currents flowing through the heater wires that are wired adjacent to each other are substantially anti-parallel to each other.

12. The radome for the on-board radar device according to claim 1, wherein
   directions of currents flowing through the heater wires that are wired adjacent to each other are substantially anti-parallel to each other.

\* \* \* \* \*